Sept. 26, 1950  W. B. FOREMAN  2,523,563
LATHE LOADING AND LOG CENTERING MACHINE
Filed Nov. 27, 1944  3 Sheets—Sheet 1
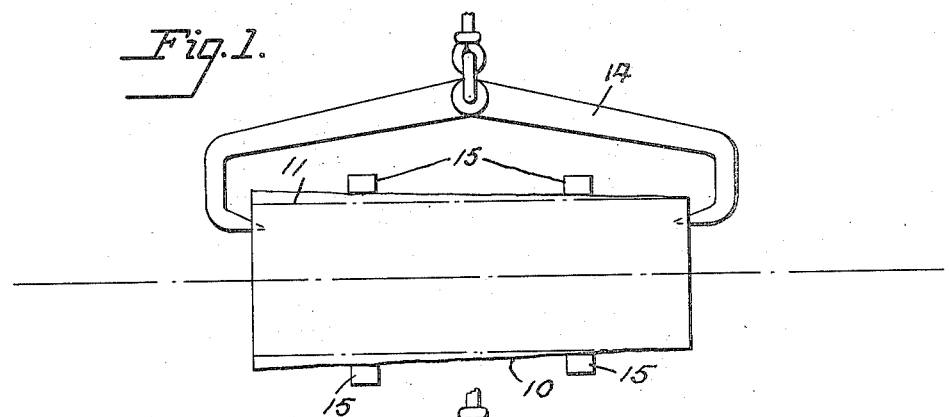
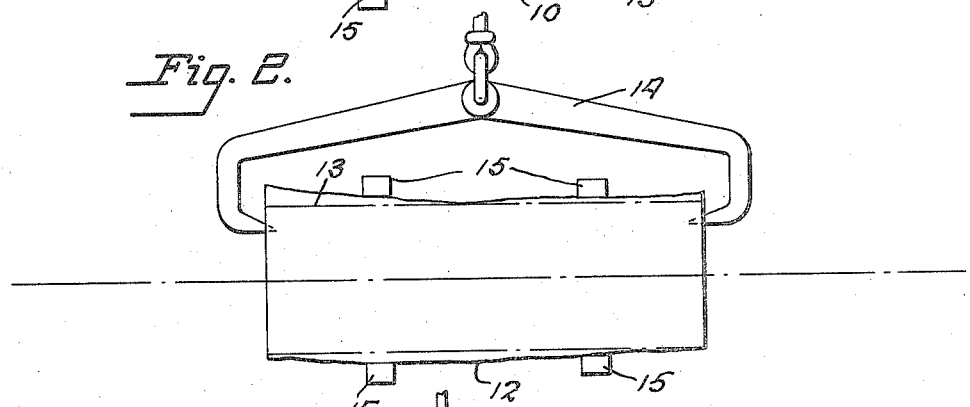
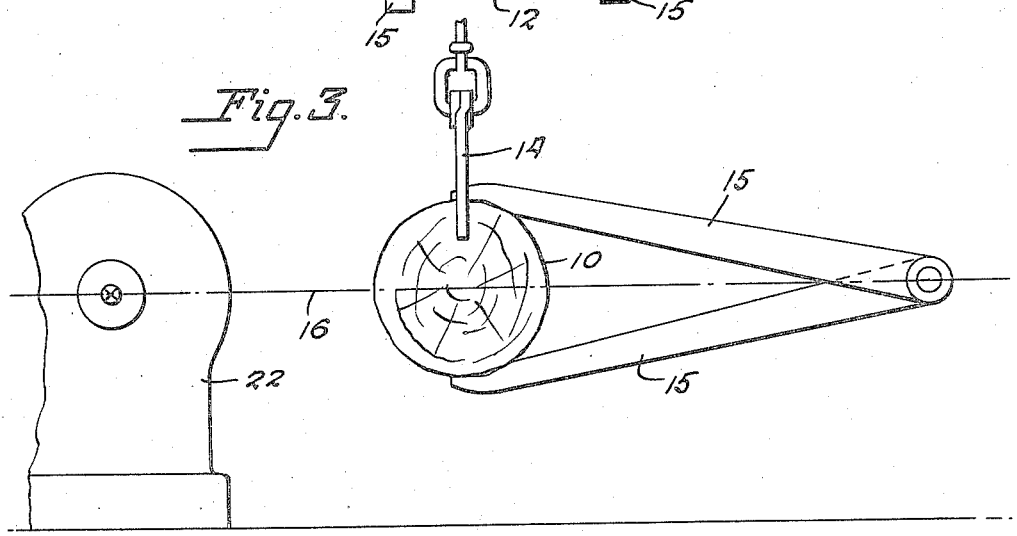
Inventor
W. B. Foreman
By Mason Fenwick & Lawrence
Attorneys

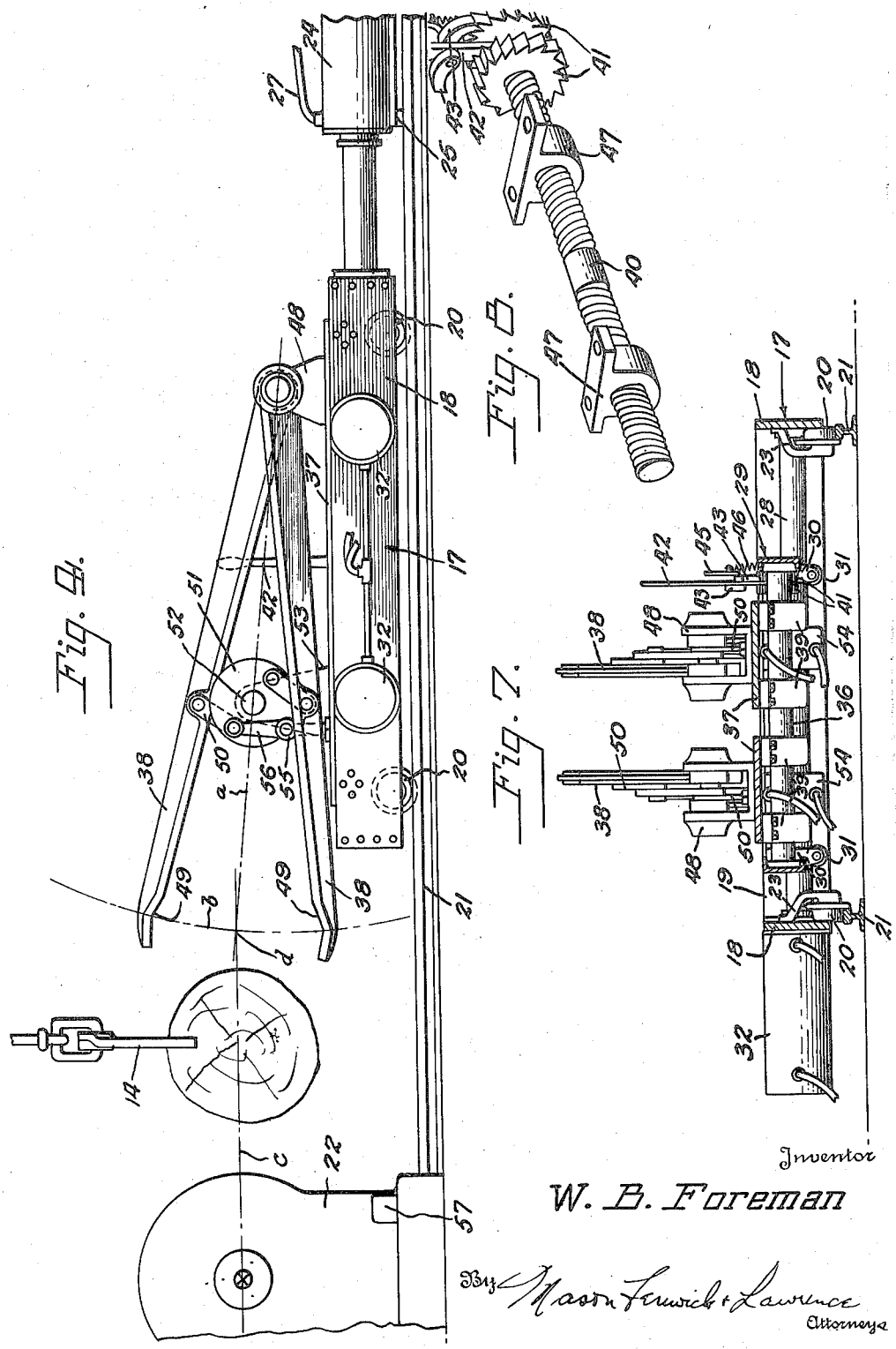

Sept. 26, 1950  W. B. FOREMAN  2,523,563
LATHE LOADING AND LOG CENTERING MACHINE
Filed Nov. 27, 1944  3 Sheets-Sheet 3
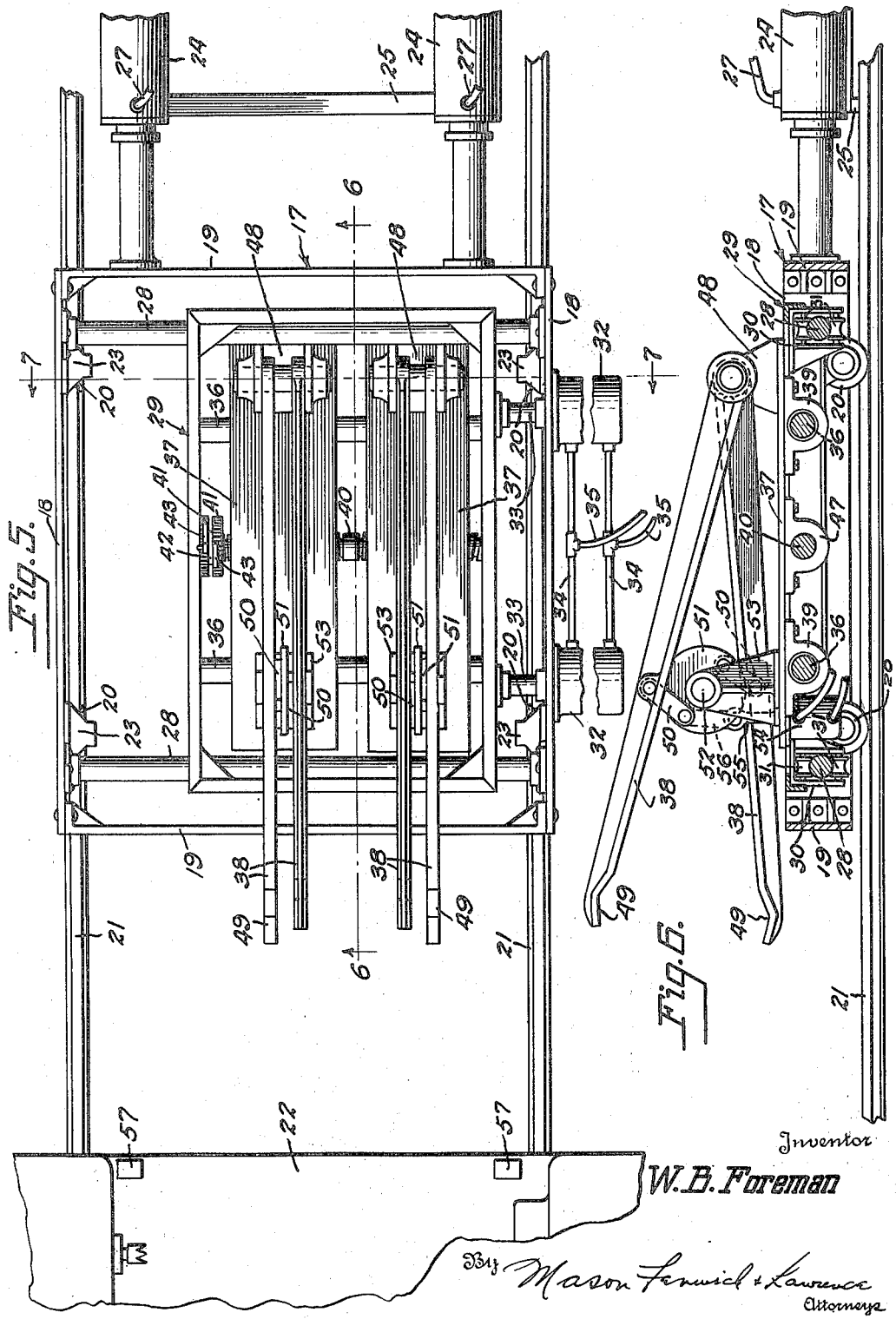
Inventor
W. B. Foreman
By Mason Fenwick & Lawrence
Attorneys Patented Sept. 26, 1950

2,523,563

UNITED STATES PATENT OFFICE 2,523,563

LATHE LOADING AND LOG CENTERING MACHINE

William Blades Foreman, Elizabeth City, N. C.

Application November 27, 1944, Serial No. 565,293

2 Claims. (Cl. 214—1)

This invention relates to a method and means for log centering and lathe loading for use in connection with lathes for cutting veneer and plywood sheets.

The procedure now practiced in setting up a log in a veneer lathe is quite time consuming and results in an unnecessarily great amount of waste material. The present practice is to employ an overhead crane equipped with tongs to lift a log and bring it into position at the lathe. As very few logs are of perfect frusto-conical, or cylindrical shape, the operation of positioning the log is not a simple one of engaging the lathe head and tail stocks at the diametrical centers of the cut ends of the log. Usually, the ends of the logs are not true circles, and most logs are bowed at least slightly from end to end. Therefore, even though the true end centers are found, a line connecting the true centers of the ends does not necessarily represent the axial center of the cylinder of greatest diameter which may be cut from the log. It is usually necessary to mount the log off center at the ends to cut down on waste and secure the maximum amount of veneer from a given log. The proper centers, or as near thereto as possible, are obtained by a "rock of the eye" method. The reliance upon the operator's judgment, the accuracy of his eye, is bound to result in errors and consequent waste.

The method described above is very slow and requires long periods of inactivity of the lathe. This setting up of the log actually requires a greater period of time than the cutting of the log. Thus the lathe is inactive more than it is in use.

The object of the present invention is to provide a method for loading a lathe which will materially reduce the periods of inactivity of the lathe. It provides for positioning the axis of the cylinders of largest diameter contained in the log parallel to the axis of the lathe chucks at a point removed from the lathe, and moving the log until the log axis is coincident with the axis of the lathe chucks.

A further object of the invention is to provide a machine by means of which the above method may be carried out.

Another object of the invention is to provide such a machine having means automatically to center the log approximately, and means for adjustment to shift the center if necessary.

Other objects of the invention will appear from the following description taken in conjunction with the drawings which accompany and form a part of this specification and throughout the several figures of which the same characters of reference are used to denote identical parts.

In the drawings:

Figure 1 is a diagrammatic view illustrating a log held suspended and positioned within gripping jaws for centering;

Figure 2 is a view similar to Figure 1 but showing a log of irregular contour;

Figure 3 is a diagrammatic side view of a supported log and a lathe;

Figure 4 is a side elevation of the log centering and lathe loading machine and a portion of a lathe;

Figure 5 is a plan view of the machine shown in Figure 4;

Figure 6 is a vertical section taken on the line 6—6 of Figure 5;

Figure 7 is a transverse vertical section taken on the line 7—7 of Figure 5; and, Figure 8 is a perspective view of an adjusting mechanism.

Referring to the drawings in detail, a study of Figures 1 to 3 inclusive will reveal the underlying principles upon which the invention is based.

As stated before, the invention seeks to accomplish two things: First, to increase the output of the veneer lathe; and, second, to materially reduce waste by simplifying the center-locating procedure and to some extent eliminating the element of human error.

To accomplish the first, the center of the log is determined before the log is placed in the lathe and while the lathe is in operation cutting a previously centered log. The center which is determined is positioned parallel to the axis of the chuck spindles of the lathe, and, at the proper time, the log is moved into the lathe until its predetermined center is coincident with the axis of the lathe spindles. Thus the lathe is in more or less continual operation, the long periods of inactivity during the centering operation being eliminated.

The second point is accomplished by so centering the log that its axis of rotation will be the axis of the largest cylinder obtainable from the log. With a straight tapered log such as shown at 10 in Figure 1, the matter is a simple one, as the small end of the log represents the cylinder 11 of largest diameter obtainable. In this case, the centers of the two ends are the opposite poles of the axis of rotation and with the log so centered on the lathe there will be minimum waste.

With a curved log 12, as shown in Figure 2, the problem is not so simple. In such cases the poles of the axis of the largest cylinder 13 contained in the log are not coincident with the centers of the ends.

With the present method, the log is picked up from a pile by means of tongs 14, and if the log is curved the tongs are so arranged that the log will hang belly down as shown in Figure 2. The tongs are carried by a traveling crane (not shown) which lifts the log and transports it to a point near the lathe. Here two pairs of pivoted jaws 15 may be positioned, the pairs being spaced from one another. The jaws are so positioned that they swing equidistant on opposite sides of a plane which embraces the axis of the lathe spindles. This plane is indicated by the line 16. It can be readily seen that if the jaws of each pair are moved simultaneously toward one another after the log is placed between the jaws, the centers of the cross-sections of the logs at the jaws when the jaws engage the log will be in the plane represented by the line 16. If the log is a straight one, as shown in Figure 1, these centers will be on the axis of the log and the log will be properly centered.

When a curved log is encountered, the axis of the cylinder of largest diameter obtainable from the log is seldom coincident with a line connecting the centers of the log ends. The axis of the cylinder may be above or below the end centers, or the axis may be below at one end and above at the other. By varying the distance between the pairs of jaws 15 so as to grip the log at different points, a curved log, as shown in Fig. 2, will be lifted or lowered with respect to the axis of the lathe. By moving the log axially to shift its position with respect to the jaws the log may be tilted to bring the axis of the cylinder of greatest diameter into coincidence with the plane of the lathe spindles.

When the log is centered, the jaws carrying the log may be moved toward the lathe maintaining the axis of the log in the plane 16. When the axis of the log comes in coincidence with the axis of the lathe spindles, the lathe is operated to sink the spindles into the log and the lathe is set up ready for operation. As the log is being cut a second log is put through the centering operation to prepare it for positioning in the lathe after the first has been completely cut.

A machine for centering the logs and loading the lathe is illustrated in Figures 4 to 8 inclusive. The machine comprises a main carriage 17 of rectangular form, having side frame members 18 and end members 19. The frame is braced in any suitable manner and is mounted upon flanged wheels 20 adapted to roll upon rails 21 which are laid up to the lathe 22. The wheels are journaled upon hangers 23 fixed to the side frame members 18. The carriage is moved on the track by means of hydraulic cylinders 24 which are mounted upon a fixed sill 25. Piston rods 26 are bolted to the rear end frame member 19. The pistons are double acting and their operation may be controlled in any suitable manner such as by valves on the air line 27.

Extending transversely across the main carriage between the side frame members and near either end thereof are shafts 28 forming guide rails upon which a secondary carriage 29 is mounted for movement transversely of the main carriage. The secondary carriage is also rectangular in form, and is of channel iron construction. Hangers 30 depend from the frame of the secondary carriage, each carrying two rollers 31 for engagement with opposite sides of the guide rails 28. The double wheel arrangement fastens the secondary carriage to the main carriage so that the secondary carriage will not tilt or leave the guide rails under the weight of the log. Double acting hydraulic cylinders 32 are attached to the side rails 18 of the main frame and have their piston rods 33 fixed to the side rails of the secondary carriage. By this means the secondary carriage may be moved from side to side upon the main carriage. It will be noted that the cylinders 32 are connected as at 34 and are fed from a common source of supply 35 so that the actions of the pistons will be equalized to prevent straining the carriage frame.

Secondary carriage 29 is also provided with transverse guide rails 36. These guide rails serve as supports for movable platforms 57 which carry the log handling jaws 38 which are similar to the jaws 15 in Figures 1 to 3. Platforms 37 are supported upon bearings 39 which are slidable on the guide rails 36. An actuating shaft 40 is disposed across the secondary frame 29 between the guide rails 36. Shaft 40 is oppositely threaded from its mid-point out to the ends. The thread is heavy to withstand the great strains which will be imposed upon it. At one end the shaft 40 is provided with a pair of ratchets 41, spaced from one another, and having their teeth oppositely disposed. Loosely pivoted on shaft 40 between the ratchets 41 is a lever 42 having pivoted thereon dogs 43. Dogs 43 are fixedly secured upon a pivot pin 44 on opposite sides of the lever 42, each being in the plane of one of the ratchets 41. The dogs are so positioned that when one of the dogs is in engagement with its ratchet the other dog is lifted out to engagement with its ratchet. One end of the pivot pin 44 is extended and bent at right angles to form a lever 45 by means of which the dogs may be swung into and out of engagement with their respective ratchets. A spring 46 has one end attached to the lever 45 and its opposite end attached to the frame of the secondary carriage. The spring is arranged so that when one dog is engaged with its ratchet the spring will pass to one side of the pivot 44 to yieldingly hold that dog in engagement. When the lever 45 is moved to throw the other dog into operation the spring snaps to the opposite side of the pivot. By this means either dog may be placed in operation whereby oscillation of the lever 42 will rotate the shaft 40 in the desired directon.

Each platform 37 is provided with a member 47 internally threaded for engagement with the shaft 40. The platforms are positioned on opposite sides of the middle of shaft 40 so that the respective members 47 engage oppositely disposed threaded portions of shaft 40. It can be readily seen that after throwing the proper dog 43 into engagement with its ratchet 41 oscillation of the lever 42 will cause the platforms 37 to draw closer to one another or to separate.

Each platform 37 carries a bearing 48 to which a pair of log gripping jaws 38 are pivoted. The jaws 38 are relatively long and extend to a point beyond the front of the main carriage. Each jaw is provided with an angular or curved gripping portion 49 near its outer end. Intermediate their ends, the jaws are connected by links 50 to a disk 51 mounted upon a shaft 52 supported in bearings 53 carried by the platform 37. A hydraulic piston 54 is used to rock the disk 51 to open or close the jaws 38. The piston rod 55 is coupled to the disk by means of a link 56.

The above completes the description of the elements of the machine, their assembly and mode of operation. There are, however, several important features which must be considered.

Referring particularly to Figure 4, there are shown three construction lines lettered a, b, and c. The line a passes through both the pivot for the jaws and the center of the shaft 52 upon which disk 51 is mounted. This line, therefore, is the bisector for the included angle of the jaws, and, although fixed in position, remains the bisector regardless of the degree of separation of the jaws.

The line b is curved and is an arc of a circle whose center is the pivotal point of the jaws. The line connects the midpoints of the depressions 49 in the gripping ends of the jaws, and represents the line of travel of these depressions as the jaws are moved.

The line c represents a horizontal plane passing through the axis of the lathe spindles, the plane being parallel to the rails 21 upon which the loading machine rides.

It will be noted that the three lines a, b, and c intersect at a common point d. This is essential. The log when placed between the jaws will seat in the depressions 49, and as the log is of generally circular cross-section, the cross-section of the log between the jaws will have its center coincident with the point d. As the loading machine moves upon the rails 21 the center of the log will be maintained on the line c until it is in position between the lathe spindles. To facilitate the final centering of the log, stops 57 may be fixed to the base of the lathe against which the forward edge of the main carriage may abut when the point d lies within the axis of the lathe spindles.

In operation, the log is loaded belly down into the jaws of the machine by means of a crane and tongs, as has been described. If, due to the curvature of the log, the center is too high or too low, the hand lever 42 is operated to move the platforms 37 and jaws closer together or further apart as conditions call for. After the log is correctly gripped by the jaws, pistons 24 are actuated to move the log into the lathe. When the main carriage has reached its limit of travel the log will be correctly centered. The secondary carriage is then set into motion to move the log longitudinally into engagement with the head spindle. The hydraulic cylinders 32 will have sufficient power to move the secondary carriage and log until the spindle prongs are slightly imbedded in the end of the log. The pressure of the cylinders is regulated so that the carriage will stop before the log is fully on the spindle. Sufficient pressure to completely seat the spindle would place too great a strain upon the machine and might cause twisting of the jaws or other parts of the mechanism. To complete the setting, the tail stock of the lathe is moved up until its spindle engages the other end of the log. Further movement of the tail stock sinks both head and tail spindles and completes the operation. Power is maintained on the cylinders 32 during the complete setting operation so that as the log is moved by the tail stock the secondary carriage which still has its jaws in gripping engagement with the log will move under its own power to relieve strain. After the log is completely set, power is reversed to all cylinders, 54, 32, and 24, to respectively open the jaws, return the secondary carriage to its original position upon the main carriage, and to return the main carriage to its original position. The machine is then in readiness to receive another log while the cutting of the first log in the lathe proceeds.

While a preferred and practical embodiment of the invention has been shown and described herein, it is by way of example only, and many variations from the precise structure disclosed may be made within the scope of the appended claims.

What is claimed is:

1. A log handling carriage comprising main and secondary carriages, said secondary carriage being mounted upon said main carriage for movement thereon transversely to the direction of movement of said main carriage, parallel guide members extending across said secondary carriage in the direction of movement of said secondary carriage, a pair of platforms mounted for movement upon said guide members, a control rod journaled in said secondary carriage and positioned parallel to said guide members, said control rod being threaded with the thread to one side of the mid-point of the rod being a right hand thread and the thread on the other side of the mid-point being a left hand thread, said platforms having threaded portions the threaded portion on one platform engaging the left hand thread of said control rod and the threaded portion on the other platform engaging the right hand thread of said control rod, a pair of ratchets fixedly mounted upon said control rod the teeth of one ratchet being oppositely disposed to the teeth of the other, an operating lever pivotally mounted upon said control rod and having a pair of dogs alternately engageable one dog with each of said ratchets, a pair of pivoted jaws mounted upon each of said platforms, said jaws having log gripping portions near their free ends, the jaws being positioned on said secondary carriage with their pivotal points near one side of the carriage and the log gripping ends extending beyond the opposite side of the carriage, and means supported on said platforms to move said jaws equally and simultaneously toward and away from one another, said means being supported by said platforms and located intermediate said pivotal point and said log gripping portions whereby the load imposed upon said jaws is distributed over said carriage to prevent tipping of the carriage.

2. In a log handling carriage as claimed in claim 1, means to operate said jaw moving means comprising a fluid pressure cylinder carried by each platform, the cylinder being connected in parallel to a single source of supply, whereby the jaws on the respective platforms may move in unequal amounts to accommodate themselves to unequal diameter of the log to be gripped in the planes of the respective pairs of jaws.

WILLIAM BLADES FOREMAN.

REFERENCES CITED

The following references are of record in the file of this patent:

UNITED STATES PATENTS

| Number | Name | Date |
|---|---|---|
| 198,327 | Winn | Dec. 18, 1877 |
| 1,646,115 | Sjostrom | Oct. 18, 1927 |
| 1,933,225 | Smith | Oct. 31, 1933 |
| 1,933,226 | Smith et al. | Oct. 31, 1933 |
| 2,352,885 | Bukowsky | July 4, 1944 |